United States Patent
Leitch et al.

(10) Patent No.: US 9,140,012 B1
(45) Date of Patent: Sep. 22, 2015

(54) ROOFING SHINGLE SYSTEM AND SHINGLES FOR USE THEREIN

(71) Applicant: BUILDING MATERIALS INVESTMENT CORPORATION, Dallas, TX (US)

(72) Inventors: Olan Leitch, Bakersfield, CA (US); Sean Marren, Evansville, IN (US); Destrey C. McDowell, Mt. Vernon, IN (US); Stephen A. Buzza, Newburgh, IN (US)

(73) Assignee: Building Materials Investment Corporation, Dallas, TX (US)

( * ) Notice: Subject to any disclaimer, the term of this patent is extended or adjusted under 35 U.S.C. 154(b) by 0 days.

(21) Appl. No.: 14/577,029

(22) Filed: Dec. 19, 2014

Related U.S. Application Data

(63) Continuation-in-part of application No. 14/266,294, filed on Apr. 30, 2014, and a continuation-in-part of application No. 14/527,279, filed on Oct. 29, 2014, which is a continuation-in-part of application No. 14/266,294, filed on Apr. 30, 2014.

(51) Int. Cl.
 *E04D 1/26* (2006.01)
 *E04D 1/28* (2006.01)

(52) U.S. Cl.
 CPC ... *E04D 1/28* (2013.01); *E04D 1/26* (2013.01)

(58) Field of Classification Search
 CPC .................................. E04D 1/26; E04D 1/28
 USPC ........ 52/311.1, 314, 523, 525, 526, 554, 557, 52/559, DIG. 16; 156/256, 264
 See application file for complete search history.

(56) References Cited

U.S. PATENT DOCUMENTS

| | | | | | |
|---|---|---|---|---|---|
| 1,130,368 | A | * | 3/1915 | Bird | 52/545 |
| 1,277,861 | A | * | 9/1918 | Clarke | 52/559 |
| 2,060,618 | A | * | 11/1936 | Honigbaum | 52/526 |
| 2,538,206 | A | * | 1/1951 | Mabie, Sr. et al. | 52/523 |
| 2,801,599 | A | * | 8/1957 | Bordeaux | 52/526 |
| 3,973,369 | A | * | 8/1976 | Smith | 52/526 |
| 4,541,217 | A | * | 9/1985 | Stewart | 52/518 |
| 4,717,614 | A | * | 1/1988 | Bondoc et al. | 428/143 |
| 4,729,814 | A | * | 3/1988 | Jennus et al. | 156/512 |
| 4,869,942 | A |   | 9/1989 | Jennus et al. | |
| D313,278 | S | * | 12/1990 | Noone | D25/139 |

(Continued)

OTHER PUBLICATIONS

Information Disclosure Statement submitted in U.S. Appl. No. 10/777,950, now U.S. Pat. No. 7,805,905 on May 24, 2010 (7 pages).

*Primary Examiner* — Jeanette E Chapman
*Assistant Examiner* — James Buckle, Jr.
(74) *Attorney, Agent, or Firm* — Fitzpatrick, Cella, Harper & Scinto

(57) ABSTRACT

A laminated roofing shingle is disclosed comprising a posterior layer with simulated tabs and an anterior layer with tabs spaced apart by openings, wherein each posterior simulated tab is partially covered by a corresponding anterior tab, wherein at least one anterior tab has a first anterior tab breadth and at least another anterior tab has a second anterior tab breadth, and wherein at least one anterior opening has a first anterior opening breadth that is about equal to the second anterior tab breadth and wherein at least another anterior opening has a second anterior opening breadth that is about equal to the first anterior tab breadth. Also disclosed is a roofing system comprising a plurality of courses of the shingle.

22 Claims, 11 Drawing Sheets

(56) References Cited

U.S. PATENT DOCUMENTS

| | | | |
|---|---|---|---|
| D313,658 S * | 1/1991 | Noone | D25/139 |
| 5,102,487 A * | 4/1992 | Lamb | 156/260 |
| 5,181,361 A * | 1/1993 | Hannah et al. | 52/535 |
| 5,195,290 A * | 3/1993 | Hulett | 52/518 |
| 5,209,802 A * | 5/1993 | Hannah et al. | 156/250 |
| D336,347 S * | 6/1993 | Hannah et al. | D25/139 |
| D340,294 S * | 10/1993 | Hannah et al. | D25/139 |
| 5,287,669 A * | 2/1994 | Hannah et al. | 52/518 |
| D350,615 S * | 9/1994 | Klein et al. | D25/139 |
| 5,347,785 A * | 9/1994 | Terrenzio et al. | 52/555 |
| 5,375,387 A * | 12/1994 | Davenport | 52/557 |
| 5,375,491 A | 12/1994 | Hannah et al. | |
| 5,426,902 A * | 6/1995 | Stahl et al. | 52/314 |
| D366,124 S * | 1/1996 | Hannah et al. | D25/139 |
| D366,335 S * | 1/1996 | Noone et al. | D25/139 |
| 5,488,807 A | 2/1996 | Terrenzio et al. | |
| D375,563 S * | 11/1996 | Hannah et al. | D25/139 |
| D376,660 S * | 12/1996 | Hannah et al. | D25/139 |
| 5,660,014 A | 8/1997 | Stahl et al. | |
| D388,195 S * | 12/1997 | Hannah et al. | D25/139 |
| 5,901,517 A | 5/1999 | Stahl et al. | |
| 6,014,847 A * | 1/2000 | Phillips | 52/311.1 |
| 6,038,827 A * | 3/2000 | Sieling | 52/557 |
| D422,719 S * | 4/2000 | Belt et al. | D25/139 |
| D426,002 S * | 5/2000 | Bondoc et al. | D25/139 |
| 6,058,670 A * | 5/2000 | Sieling et al. | 52/554 |
| 6,092,345 A * | 7/2000 | Kalkanoglu et al. | 52/554 |
| 6,105,329 A * | 8/2000 | Bondoc et al. | 52/557 |
| 6,195,951 B1 * | 3/2001 | Stahl et al. | 52/314 |
| 6,212,843 B1 * | 4/2001 | Kalkanoglu et al. | 52/555 |
| 6,220,329 B1 * | 4/2001 | King et al. | 156/512 |
| 6,305,138 B1 * | 10/2001 | Stahl et al. | 52/314 |
| 6,401,425 B1 * | 6/2002 | Frame | 52/748.1 |
| 6,419,780 B1 * | 7/2002 | Queisser | 156/259 |
| 6,421,976 B1 * | 7/2002 | Elliott et al. | 52/555 |
| 6,457,290 B1 * | 10/2002 | Elliott | 52/557 |
| 6,467,235 B2 | 10/2002 | Kalkanoglu et al. | |
| 6,523,316 B2 | 2/2003 | Stahl et al. | |
| 6,546,688 B1 * | 4/2003 | Parsons | 52/518 |
| 6,578,336 B2 | 6/2003 | Elliott | |
| 6,679,020 B2 * | 1/2004 | Becker et al. | 52/518 |
| 6,708,456 B2 * | 3/2004 | Kiik et al. | 52/98 |
| 6,715,252 B2 | 4/2004 | Stahl et al. | |
| D554,275 S * | 10/2007 | Sieling et al. | D25/143 |
| 7,665,261 B2 * | 2/2010 | Elliott et al. | 52/557 |
| 7,805,905 B2 | 10/2010 | Rodrigues et al. | |
| 8,397,460 B2 | 3/2013 | Rodrigues et al. | |
| 2004/0083673 A1 * | 5/2004 | Kalkanoglu et al. | 52/555 |
| 2007/0017330 A1 * | 1/2007 | Freshwater et al. | 83/13 |
| 2009/0151288 A1 * | 6/2009 | Kalkanoglu et al. | 52/554 |
| 2009/0229210 A1 * | 9/2009 | Binkley et al. | 52/543 |
| 2010/0205898 A1 * | 8/2010 | Rodrigues et al. | 52/745.19 |
| 2013/0019554 A1 | 1/2013 | Rodrigues et al. | |

* cited by examiner

ROOFING SHINGLE SYSTEM AND SHINGLES FOR USE THEREIN

RELATED APPLICATIONS

This application is a continuation-in-part of U.S. Non-Provisional application Ser. No. 14/266,294, filed on Apr. 30, 2014, entitled "Roofing Shingle System and Shingles for Use Therein," and is a continuation-in-part of U.S. Non-Provisional application Ser. No. 14/527,279, filed on Oct. 29, 2014, entitled "Roofing Shingle System and Shingles for Use Therein," which is a continuation-in-part of the aforementioned U.S. Non-Provisional application Ser. No. 14/266,294, each of which is incorporated herein by reference in its entirety for all purposes within this application.

FIELD OF THE INVENTION

This invention relates to an improved roofing shingle having the bulk (i.e., thicker appearance) and configuration of more expensive roofing shingles and a roofing system that utilizes the shingles. In particular, the invention relates to roofing shingles featuring unique dimensions that improve weather resistance and minimize the amount of material required to make the shingles, as well as a roofing system that utilizes the shingles.

BACKGROUND OF THE INVENTION

Roofing products are often divided into three broad groups: shingles, roll roofing, and underlayment. Shingles and roll roofing typically function as outer roof coverings designed to withstand exposure to weather and the elements. Shingles and roll roofing generally contain the same basic components which provide protection and long term wear associated with asphalt roofing products. These components include a base material made from an organic felt or fiberglass mat which serves as a matrix to support the other components and gives the product the required strength to withstand manufacturing, handling, installation and service in the intended environment. An asphalt coating formulated for the particular service application is often applied to the base material to provide the desired long-term ability to resist weathering and to provide stability under temperature extremes. An outer layer of mineral granules is also commonly applied to the asphalt coating to form a surface exposed to the weather which shields the asphalt coating from the sun's rays, adds color to the final product and provides fire resistance.

Asphalt shingles are among the most commonly used roofing materials. Such shingles are typically manufactured as single layer strip shingles, laminated shingles having two or more layers, interlocking shingles and large individual shingles in a variety of weights and colors. Such laminated asphalt shingles are also often referred to as composite shingles or as architectural shingles or dimensional shingles. Even though asphalt shingles offer significant cost, service life and flammability advantages over slate or wood shingles, slate or wood shingles are still often preferred due to the pleasing aesthetic appearance of a slate or wood shingled roof. An important aesthetic advantage of such slate or wood shingles is their greater thickness as compared to composite shingles. The thickness of slate or wood shingles results in a more pleasing, layered look for the finished roof.

Various composite shingles have been developed to provide an appearance of thickness comparable to slate or wood shingles. Examples of such composite shingles are shown in U.S. Pat. No. 7,805,905 entitled Roofing Shingle; U.S. Pat. No. 8,397,460 entitled Roofing Shingle; U.S. Pat. Appl. Publ. No. 2013/0019554 entitled Roofing Shingle; U.S. Pat. Appl. Publ. No. 2010/0205898 entitled Roofing Shingle; U.S. Pat. No. D554,275 entitled Roof Shingle; U.S. Pat. No. D388,195 entitled Shingle; U.S. Pat. No. D366,124 entitled Tab Portion Of A Shingle; U.S. Pat. No. D375,563 entitled Shingle; U.S. Pat. No. D376,660 entitled Shingle; U.S. Pat. No. D336,347 entitled Tab Portion Of A Shingle; U.S. Pat. No. D340,294 entitled Design For A Tab Portion Of A Shingle; U.S. Pat. No. D366,335 entitled Design For A Tab Portion Of A Shingle; U.S. Pat. No. 6,105,329 entitled Trilaminate Roofing Shingle; U.S. Pat. No. 6,220,329 entitled Apparatus for Making Laminated Roofing Shingles; U.S. Pat. No. 5,102,487 entitled Manufacturing Roofing Shingles; and assignee's co-pending U.S. patent application Ser. No. 14/266,294 entitled Roofing Shingle System and Shingles For Use Therein.

U.S. Pat. Nos. 7,805,905 and 8,397,460, and U.S. Pat. Appl. Publ. Nos. 2013/0019554 and 2010/0205898 disclose two-layer composite roofing shingles with a posterior layer having a posterior headlap and a plurality of posterior tabs extending from the posterior headlap; and an anterior layer, positioned on the posterior layer, having an anterior headlap and at least one alignment notch and at least one anterior tab extending from the anterior headlap, where at least one anterior tab is positioned on the plurality of posterior tabs. At least one anterior tab is absent in two-layer embodiments of the inventions described in the above disclosures, such that the shingles have at least one single-layer tab (i.e., a posterior tab without a corresponding anterior tab positioned over said posterior tab). When installed, this presence and absence of an anterior tab on the shingles along with the posterior tabs and optional shadow bands and shadow tips simulate a variable thickness slate surface.

U.S. Pat. No. D554,275 illustrates two-layer composite roofing shingles with a posterior layer having a posterior headlap and a plurality of posterior tabs extending from the posterior headlap and an anterior layer, positioned on the posterior layer, having an anterior headlap and at least one anterior tab extending from the anterior headlap, where each anterior tab is positioned on a corresponding posterior tab and at least one anterior tab is absent, such that the shingles have at least one single-layer tab (i.e., a posterior tab without a corresponding anterior tab positioned over it). Each of the anterior tabs has the same shape and equal breadth that is less than the breadth of the posterior tabs, each of which has the same shape and equal breadth, and the anterior tabs are positioned over the center of a corresponding posterior tab.

U.S. Pat. No. D388,195 illustrates a two-layer shingle with an undivided posterior layer (i.e., without tabs) and an anterior layer having an anterior headlap and a plurality of tabs having crimped corners. The undivided posterior layer has a bottom edge contour that generally shadows the bottom edge contour of the anterior tabs. Each of the anterior tabs has the same shape and equal breadth and is separated from adjacent anterior tabs by openings of equal breadth.

U.S. Pat. No. D366,124 illustrates a two-layer tab portion of a shingle with an undivided posterior layer (i.e., without tabs) and an anterior layer having an anterior headlap and a plurality of tabs having crimped corners. The undivided posterior layer has a bottom edge contour that generally shadows the bottom edge contour of the anterior tabs. Each of the anterior tabs has the same shape and equal breadth and is separated from adjacent anterior tabs by openings of equal breadth.

U.S. Pat. Nos. D375,563 and D376,660 illustrate three-layer shingles with an undivided posterior layer (i.e., without tabs), a middle layer having a headlap and a plurality of tabs having crimped corners, and an anterior layer comprising two planks positioned over the center of two corresponding middle layer tabs and extending over the middle layer headlap. Each of the shingles illustrated has two middle layer tabs without an anterior layer plank positioned over the middle layer tab.

U.S. Pat. Nos. D336,347 and D340,294 illustrate three-layer tab portions of shingles with an undivided posterior layer (i.e., without tabs), a middle layer having a headlap of indeterminate width and a plurality of tabs having crimped corners, and an anterior layer comprising two planks positioned over the center of two corresponding middle layer tabs and extending over the fractional middle layer headlap. Each of the shingles illustrated has two middle layer tabs without an anterior layer plank positioned over said middle layer tab.

U.S. Pat. No. D366,335 illustrates a two-layer tab portion of a shingle with a posterior layer comprising a single posterior tab with crimped corners and an anterior layer comprising a single anterior tab with crimped corners positioned over the center of the posterior tab.

U.S. Pat. No. 6,105,329 discloses three-layer roofing shingles with an anterior layer having a headlap portion and a butt portion comprising a plurality of tabs of a given breadth separated by spaces approximately 0.50 to 1.25 the breadth of an anterior tab; a middle layer with the same number of tabs as the anterior tabs; and an undivided posterior layer (i.e., without tabs). The middle layer tabs have a breadth such that the middle layer tabs partially fill the spaces between the anterior tabs when the anterior layer is positioned over the middle layer. The middle layer tabs have a configuration complementary to, and are the same height as, the anterior tabs, such that a middle layer tab mirrors an adjacent anterior tab when the anterior layer is positioned over the middle layer. Each tab (e.g., anterior layer tab or middle layer tab) is a single layer of roofing material positioned over the undivided posterior layer, except for embodiments having an alignment means in the form a small tab in the anterior layer spaces, in which case, the middle layer tabs are partially covered by the small anterior tab and the middle layer tabs remain positioned over the undivided posterior layer.

U.S. Pat. No. 6,220,329 discloses three-layer roofing shingles with an anterior layer and a mid-layer, each having a headlap portion and a butt portion comprising a plurality of tabs of a given breadth separated by spaces, wherein the tabs of the butt portions of the anterior layer and mid-layer are offset from each; and an undivided posterior layer (i.e., without tabs).

U.S. Pat. No. 5,102,487 discloses a method of making laminated shingles having a generally rectangular underlay and an overlay with tabs and cutouts, wherein roofing material is cut with a cutting cylinder that has a common factor with the length of the shingle, other than the length of the shingle itself, to create a sufficient number of shingles having a different pattern of tabs and cutouts to ensure a fairly random appearance when the shingles are applied onto the roof.

Single layer asphalt shingles have also been developed to provide an appearance of thickness comparable to slate or wood shingles, such as U.S. Pat. No. D313,278 entitled Shingle.

U.S. Pat. No. D313,278 illustrates single-layer shingles with a headlap and four tabs having crimped corners. Adjacent tabs have different lengths and alternating tabs have the same length. Each tab is partially covered with granules of contrasting color values or shading with discrete rectangular outlines.

Various composite shingles have also been developed with slits or slots as part of an interlocking shingle roofing system. Examples of such composite or asphalt shingles are shown in U.S. Pat. No. 2,801,599 entitled Multiple Tab Square Butt Shingle; and U.S. Pat. No. 3,973,369 entitled Roofing Shingle.

U.S. Pat. No. 2,801,599 describes a single-layer tabbed strip roofing shingle with substantially horizontal slots that engage interlocking tabs of subsequently installed courses of shingles. The horizontal slots are not visible when the shingles are installed.

U.S. Pat. No. 3,973,369 describes a two-layered tabbed roofing shingle with diagonal slots cut into a body sheet of the shingle, but not a backing sheet affixed underneath the body sheet, wherein the slots engage with tab corners of subsequently installed courses of shingles. The diagonal slots are not visible when the shingles are installed.

Each of the above-referenced patents and patent applications is incorporated herein by reference in their entirety for all purposes within this application.

SUMMARY OF THE INVENTION

One embodiment of this invention pertains to a new laminated asphalt containing roofing shingle having superior weather resistance and an aesthetic appearance that simulates a variable thickness slate, tile or wood shake roofing surface, and which further employs a novel tab configuration and a novel backer to reduce the risk of wind failure.

A preferred embodiment of the present invention is a two-layer laminated shingle, wherein the shingle has a posterior layer (also known as a backer, e.g., a backer sheet or backer strip) and an anterior layer (also known as a facer), wherein the anterior layer of each shingle has a plurality of tabs spaced apart by a plurality of openings and the posterior layer has a plurality of "partial slots" (defined herein as openings cut into the posterior layer that do not extend to any edge of the buttlap, see, e.g., FIG. 1, feature 271), wherein the partial slots separate the posterior "simulated tabs" (defined herein as regions of the buttlap of a shingle or shingle layer that resemble traditional shingle or shingle layer tabs, but are not completely separated from adjacent similar regions at any edge of the buttlap, see, e.g., FIG. 1, feature 13), wherein the simulated tabs are connected to at least one adjacent simulated tab by a "connecting segment" (defined herein as a portion of shingle or shingle layer material disposed between simulated tabs, see, e.g., FIG. 1, feature 273), wherein the connecting segment may be located at or near the buttlap edge of the shingle or shingle layer, and wherein each of the simulated tabs on the posterior layer (posterior simulated tabs) are at least partially covered by a tab on the anterior layer (anterior tabs) such that the shingle simulates the appearance of a variable thickness slate, tile or wood shake roofing surface and better resists wind failure compared to prior art asphalt shingles that have been developed to simulate such an appearance. Prior art two-layer laminated shingles have simulated the appearance of a variable thickness slate, tile or wood shake roofing surface by having at least one posterior tab that is not covered by an anterior tab. See, e.g., U.S. Pat. No. 7,805,905. A further preferred embodiment of the present invention achieves the appearance of shingles having at least one posterior simulated tab that is not covered by an anterior tab while at least partially covering each posterior simulated tab with an anterior tab. Moreover, the connecting segments provide additional rigidity to the simulated tabs, while the partial slots provide the visual appearance of discrete tabs that help convey the appearance of bulk.

In accordance with one embodiment of the present invention, a roofing system is provided having a multiplicity of courses of roofing shingles of the invention, wherein each shingle has at least a posterior layer and an anterior layer, wherein the anterior layer of each shingle has a plurality of tabs spaced apart by a plurality of openings and the posterior layer of each shingle has a plurality of simulated tabs spaced apart by a plurality of partial slots, wherein the simulated tabs on the posterior layer (posterior simulated tabs) each have the same breadth and the tabs on the anterior layer (anterior tabs) each have a breadth that is (a) narrower than the breadth of the posterior simulated tabs and (b) selected from at least two different breadths, wherein at least two of the anterior tabs have different breadths, and wherein the openings on the anterior layer (anterior openings) each have a breadth selected from at least two different breadths, wherein at least two of the anterior openings have different breadths. When installed, the differing breadths of the anterior tabs and anterior openings create a visual pattern that may appear relatively random and aesthetically pleasing. The relatively random pattern of the anterior tabs and anterior openings creates the illusion of thickness that makes the roofing shingles appear like more expensive roofing materials such as tile, slate, or wood shakes.

The illusion of thickness may be further enhanced, for example, by employing granules of contrasting hues on the tabs or employing shade lines, including to the edges or contours of the tabs according to methods known in the art.

In a preferred embodiment, the anterior tabs do not cover the partial slots on the posterior layer (posterior partial slots).

Tabbed two-layer prior art asphalt shingles have utilized configurations wherein at least one posterior tab is not covered by an anterior tab to simulate the random appearance and increased thicknesses of more expensive roofing materials, such as slate or wood. See, e.g., U.S. Pat. No. 7,805,905. Such shingles have tabs that are only one layer thick or single-layer tabs (i.e., the posterior tabs that are not covered by an anterior tab). Although such prior art shingles have a desirable appearance, the two-layer roofing shingles disclosed in U.S. Pat. No. 7,805,905 are susceptible to wind failure when the shingles are installed in cold weather. In cold weather conditions, a relatively modest wind may lift a single-thickness tab, which is more flexible and lighter than a more rigid and heavier double thickness tab, prior to it being fully sealed. When this occurs, dust and other contaminants may land underneath the affected tab, causing it to never fully seal. This affected tab is then susceptible to lifting up due to wind, which may cause a chain reaction lifting up adjacent tabs and eventually the entire shingle.

Applicants herein disclose and claim laminated shingles with a novel anterior tab pattern that surprisingly conveys the desirable appearance of laminated shingles having at least one single-layer tab (see, e.g., FIG. 7, feature 8), but do not have any prior art single-layer tabs susceptible to wind failure. In addition, the inventive shingles result in a more efficient use of materials because less scrap pieces are generated during the manufacturing process compared to the manufacturing of prior art shingles. Moreover, the connecting segments provide additional rigidity to the simulated tabs; thereby providing further resistance to wind failure.

In a preferred embodiment, the novel dimensions and configuration of the anterior tabs and anterior openings operate to simulate the appearance of uncovered posterior tabs (e.g., U.S. Pat. No. 7,805,905), while each posterior simulated tab is at least partially covered by an anterior tab (and connected to at least one adjacent simulated tab). The shingles of the invention are believed to deter posterior layer lift up under mild wind conditions prior to the shingles fully sealing, and provide improved wind failure resistance after fully sealing compared to prior art shingles with single-layer tabs.

In a preferred embodiment, the shingles of the invention achieve the desirable appearance of a multi-layered laminated shingle having single-layer posterior tabs (i.e., uncovered posterior tabs) by employing an anterior layer tab pattern (and simulated tabs). As a result of the anterior layer tab pattern, little or no scraps are generated during formation of the anterior layer from a sheet of roofing material.

In a preferred embodiment, a shingle of the invention is a laminated roofing shingle comprising:
  (a) a posterior layer having a posterior headlap portion and a posterior buttlap portion including a plurality of posterior simulated tabs extending from said posterior headlap portion, said posterior simulated tabs spaced apart by a plurality of posterior partial slots, and each of said posterior simulated tabs is connected to at least one adjacent posterior simulated tab by a connecting segment;
  (b) an anterior layer having an anterior headlap portion and an anterior buttlap portion including a plurality of anterior tabs extending from said anterior headlap portion, said anterior tabs spaced apart to define a plurality of anterior openings between said anterior tabs; and
wherein the anterior layer is positioned on the posterior layer in a manner such that each anterior tab is positioned over a posterior simulated tab, wherein the number of posterior simulated tabs is equal to the number of anterior tabs, wherein the posterior simulated tabs have a given breadth that is about equal for each posterior simulated tab, wherein at least one anterior tab has a first anterior tab breadth and at least another anterior tab has a second anterior tab breadth that differs from the first anterior tab breadth, wherein at least one anterior opening has a first anterior opening breadth that is about equal to the second anterior tab breadth, and wherein at least another anterior opening has a second anterior opening breadth that is about equal to the first anterior tab breadth.

In a further embodiment, it is contemplated that one or more posterior simulated tabs may have differing breadths. In order to maintain the same total coverage, adjacent posterior simulated tabs should have reciprocal changes in breadth. For example, if a posterior simulated tab has a breadth that is 1" wider than the average breadth of the posterior simulated tabs, then an adjacent posterior simulated tab should have a breadth that is 1" less than the average breadth of the posterior simulated tabs.

In yet a further embodiment, it is contemplated that the anterior tabs may each have a different breadth.

In a preferred embodiment, at least one anterior tab has a first anterior tab breadth that is less than 50% the breadth of each posterior simulated tab, and at least another anterior tab has a second anterior tab breadth that is 50% or more, but less than 100%, the breadth of each posterior simulated tab, and each anterior tab does not extend over any said posterior partial slot.

In another preferred embodiment, the shingle has no alignment notch in the anterior headlap as opposed to shingles disclosed in U.S. Pat. No. 7,805,905 that have alignment notches.

In a further embodiment, it is contemplated that the shingle has one or more alignment notches in the anterior headlap. In such embodiment, the posterior simulated tabs should each have the same breadth.

In a preferred embodiment, the shingle has four posterior simulated tabs and four anterior tabs.

In a preferred embodiment, the first anterior tab breadth is about 50% the breadth of the second anterior tab breadth.

In a preferred embodiment, each anterior tab may have right angle corners and each anterior opening may have right angle corners. In another preferred embodiment, the anterior tabs may have crimped corners and the anterior openings may have crimped corners. In yet another preferred embodiment, each anterior tab may have non-straight, irregular edge contours. In yet another preferred embodiment, each anterior tab may have an edge contour that is stair-stepped, trapezoidal, angular, curved, or jagged.

In a preferred embodiment, each posterior simulated tab may have right angle corners (see, e.g., FIGS. 9 and 10, shingles 90 and 100, respectively) and each posterior partial slot may have right angle corners. In another preferred embodiment, each posterior simulated tab may have crimped corners (see, e.g., FIG. 1, shingle 10). It is further contemplated that any of the aforementioned modifications to the posterior simulated tabs and posterior partial slots may be applied to the shingles of the invention in any combination with any of the aforementioned modifications to the anterior tabs and anterior openings.

In a preferred embodiment, the first anterior tab breadth is about 2.88 inches and the second anterior tab breadth is about 5.75 inches, and the breadth of the posterior simulated tabs is about 8.25 inches.

In a preferred embodiment, the shingle is a two-layer laminated roofing shingle.

In a preferred embodiment, a roofing system of the invention comprises at least four adjacent shingles, each of the first, second, third, and fourth adjacent shingles comprising:
 (a) a posterior layer having a posterior headlap portion and a posterior buttlap portion including four posterior simulated tabs extending from said posterior headlap portion, said posterior simulated tabs spaced apart by a plurality of posterior partial slots, and each of said posterior simulated tabs is connected to at least one adjacent posterior simulated tab by a connecting segment;
 (b) an anterior layer having an anterior headlap potion and an anterior buttlap portion including four anterior tabs extending from said anterior headlap portion, said anterior tabs spaced apart to define a plurality of anterior openings between said anterior tabs;
wherein the anterior layer is positioned on the posterior layer in a manner such that each anterior tab is positioned over a posterior simulated tab, wherein the posterior simulated tabs have a given breadth that is about equal for each posterior simulated tab, wherein at least one anterior tab has a first anterior tab breadth that is less than 50% the breadth of each posterior simulated tab, wherein at least another anterior tab has a second anterior tab breadth that is 50% or more, but less than 100% the breadth of each posterior simulated tab; wherein each of the first, second, and third adjacent shingles differ from each other based on the positions of the at least one anterior tab having the first anterior tab breadth and the at least another anterior tab having the second anterior tab breadth, and wherein the first adjacent shingle and the fourth adjacent shingle are identical based on the positions of the at least one anterior tab having the first anterior tab breadth and the at least another anterior tab having the second anterior tab breadth, so that when installed, a pattern of varying anterior tab breadths is created based on the respective positions of the anterior tabs having the first anterior tab breadth and the anterior tabs having the second anterior tab breadth.

In a preferred embodiment, shingles of the invention have two anterior tabs having said first anterior tab breadth and two anterior tabs having said second anterior tab breadth.

In a preferred embodiment, shingles of the invention have one anterior tab having said first anterior tab breadth and three anterior tabs having said second anterior tab breadth.

In a preferred embodiment, shingles of the invention have three anterior tabs having said first anterior tab breadth and one anterior tab having said second anterior tab breadth.

In a preferred embodiment, a roofing system comprises a plurality of courses of shingles of the invention, wherein the shingles are installed on a roof deck in overlapping courses.

In a preferred embodiment, a shingle of the invention is a laminated roofing shingle comprising:
 (a) a posterior layer having a posterior headlap portion and a posterior buttlap portion including a plurality of posterior simulated tabs extending from said posterior headlap portion, said posterior simulated tabs spaced apart by a plurality of posterior partial slots, and each of said posterior simulated tabs is connected to at least one adjacent posterior simulated tab by a connecting segment;
 (b) an anterior layer having an anterior headlap portion and an anterior buttlap portion including a plurality of anterior tabs extending from said anterior headlap portion, said anterior tabs spaced apart to define a plurality of anterior openings between said anterior tabs; and
wherein the anterior layer is positioned on the posterior layer in a manner such that each anterior tab is positioned over a posterior simulated tab, wherein each anterior tab extends over no posterior partial slot, wherein the number of posterior simulated tabs is equal to the number of anterior tabs, wherein the roofing shingle has a length, wherein the posterior layer is formed from a cutting cylinder having a circumference that is equal to the length of said roofing shingle, and wherein the anterior layer is formed from a cutting cylinder having a circumference that is a fraction of the length of the roofing shingle.

In a preferred embodiment, the cutting cylinder used to form the anterior layer has a circumference that is a 1.5 times the length of said roofing shingle.

The shingles of the invention are improvements of roofing shingle materials known in the art, wherein the improvements are providing roofing shingles having posterior simulated tabs that are each partially covered by an anterior tab that when installed on a roof deck operate to simulate the appearance of more expensive roofing material such as wood, slate, or tile, and having improved weather performance over the prior art, especially with respect to resisting wind failure. A further improvement is a reduction of waste material during manufacturing of the shingles of the invention compared to manufacturing of prior art shingles. Another improvement is a provision of connecting segments between posterior simulated tabs that provides additional rigidity to the posterior simulated tabs, which further improves resistance to wind failure.

DETAILED DESCRIPTION OF THE FIGURES

For a more complete understanding of the present invention, and the advantages thereof, reference is now made to the following descriptions taken in conjunction with the accompanying figures, but which are not to be construed as limiting to the scope of the present invention as defined by the appended claims, in which:

FIG. 1A shows a top plan view of the anterior layer of the shingle of FIG. 1.

FIG. 1B shows a top plan view of the posterior layer of the shingle of FIG. 1.

Figure 1:
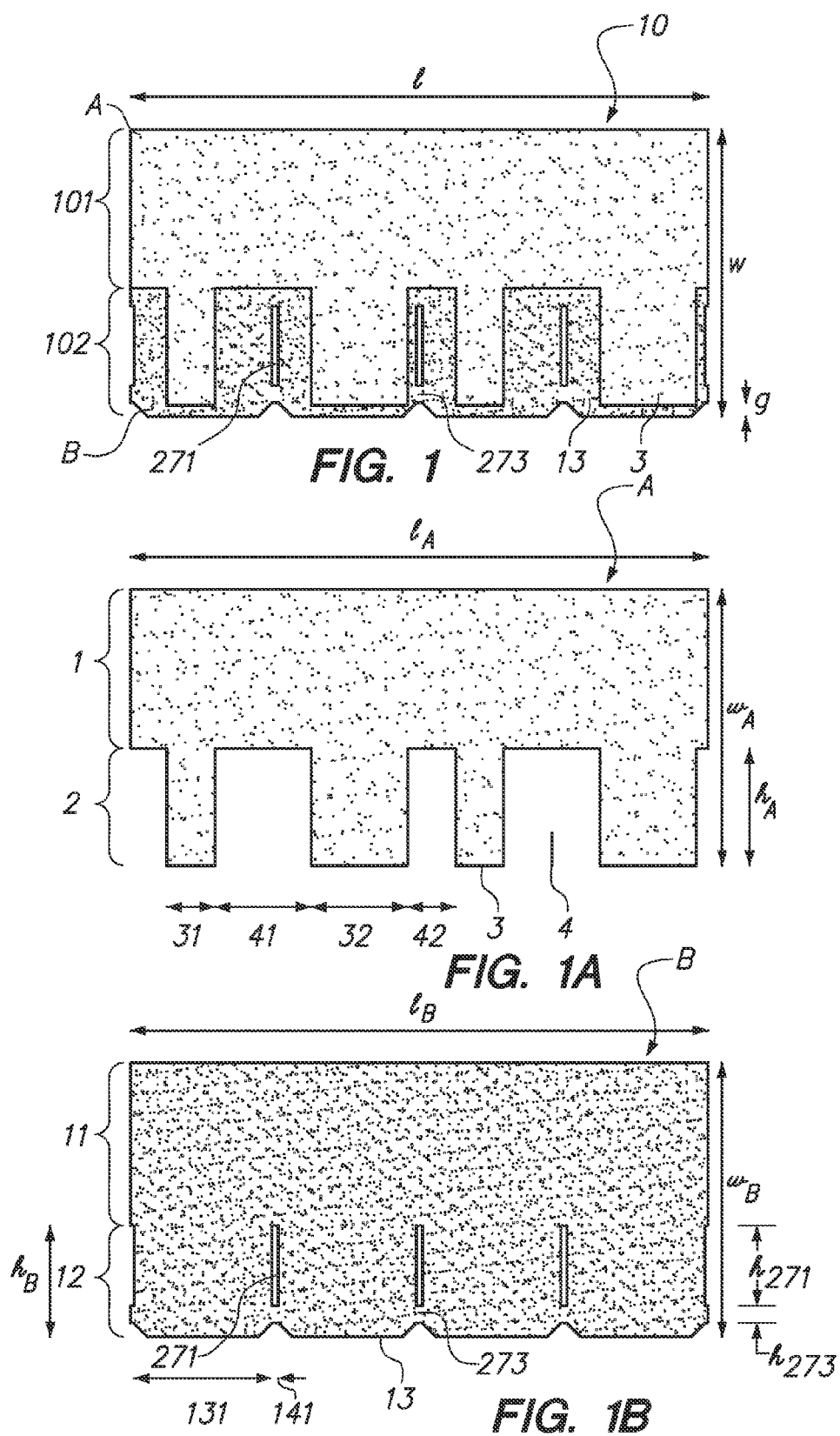
FIG. 1 shows a top plan view of an exemplary embodiment of a two-layer roofing shingle of the present invention.
Figure 5:
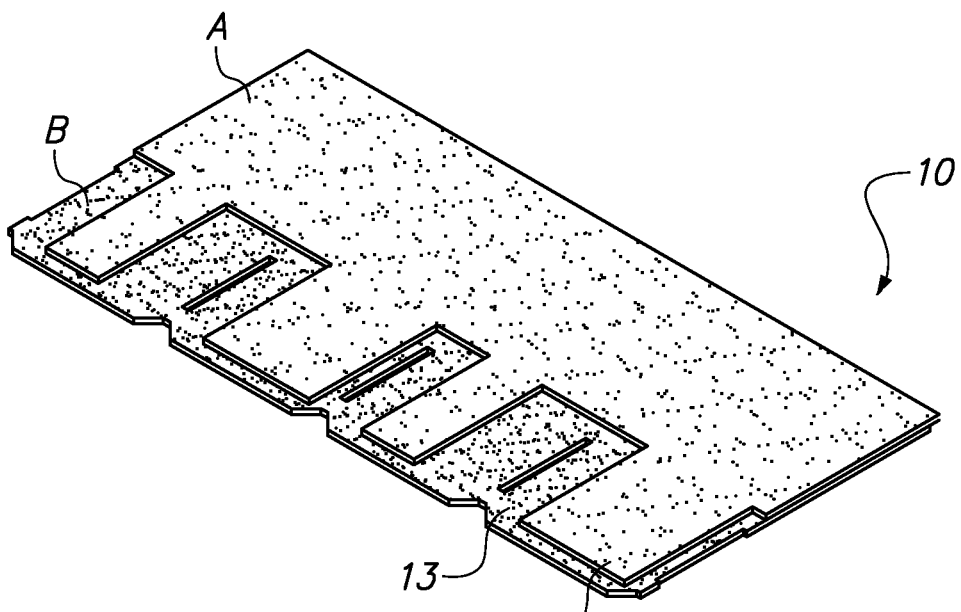
Figure 6:
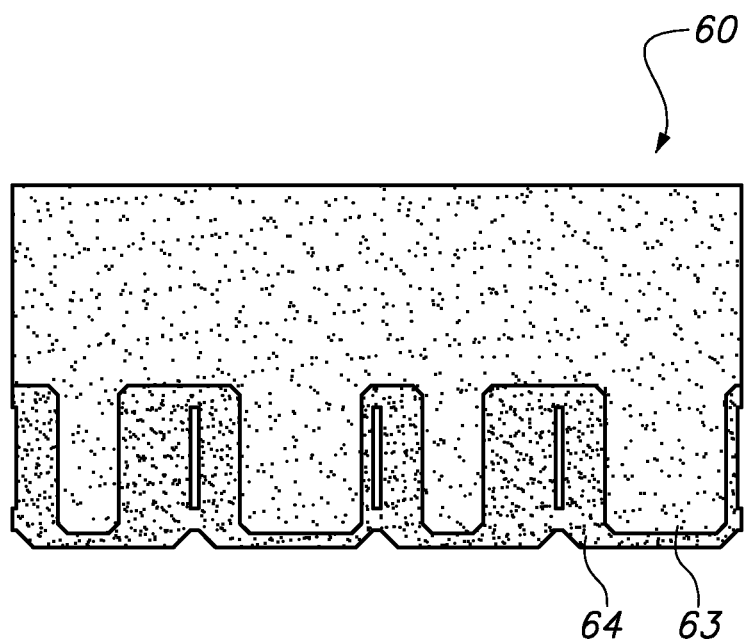

FIGS. 4, 4A, 4B, and 4C show right side views of various embodiments of the roofing shingle of the present invention;

FIG. 5 shows a perspective view of the exemplary embodiment of the roofing shingle of the present invention depicted in FIG. 1;

FIG. 6 shows a top plan view of another exemplary embodiment of a two-layer roofing shingle of the present invention, wherein the anterior tabs and anterior openings have crimped corners.

Figure 7:
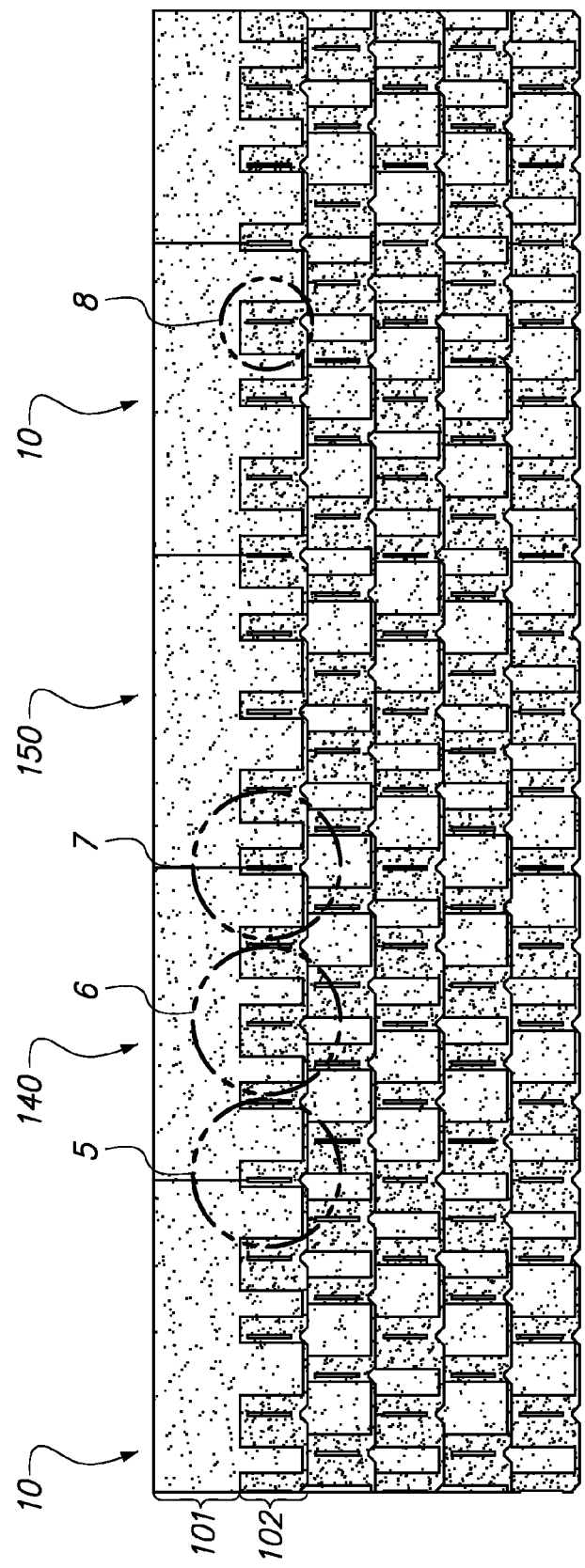
Figure 8:
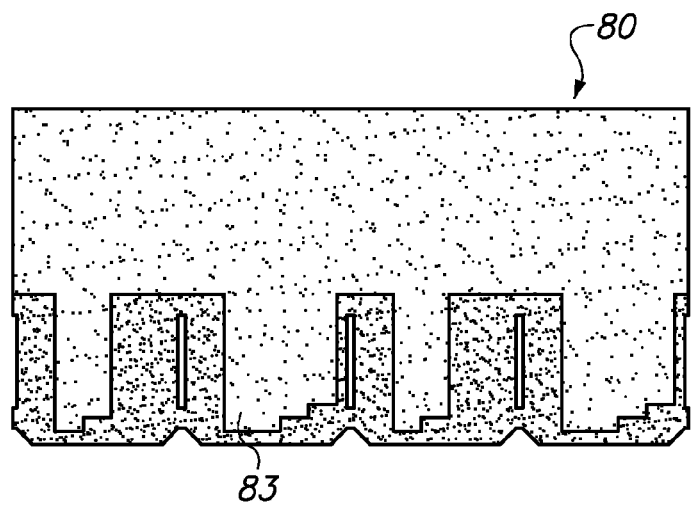
Figure 9:
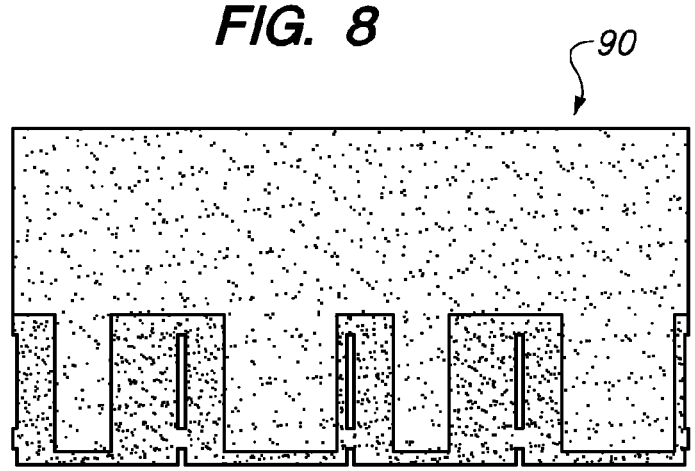

FIG. 7 shows a top plan view of an exemplary embodiment of a roofing system of the present invention incorporating the various two-layer roofing shingle embodiments of the present invention;

FIG. 8 shows a top plan view of another exemplary embodiment of a two-layer roofing shingle of the present invention, wherein the anterior tabs have stair-stepped edges;

FIG. 9 shows a top plan view of another exemplary embodiment of a two-layer roofing shingle of the present invention, wherein the posterior simulated tabs have right angle corners.

Figure 10:
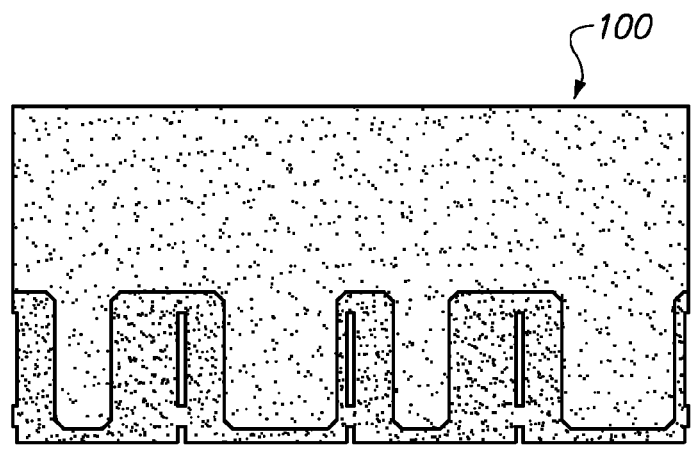

FIG. 10 shows a top plan view of another exemplary embodiment of a two-layer roofing shingle of the present invention, wherein the posterior simulated tabs have right angle corners and the anterior tabs and anterior openings have crimped corners.

Figure 11:
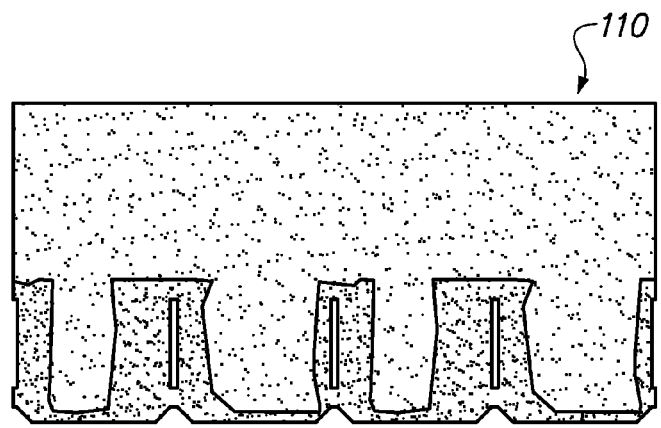

FIG. 11 shows a top plan view of another exemplary embodiment of a two-layer roofing shingle of the present invention, wherein the anterior tabs and anterior openings have non-straight, irregular edge contours.

Figure 12:
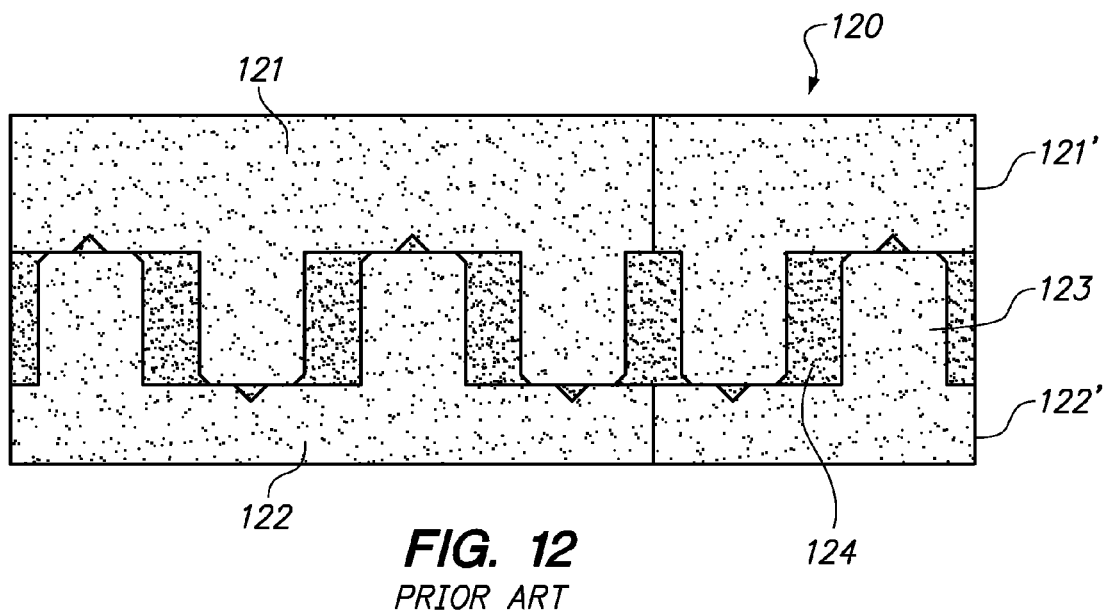

FIG. 12 shows a top plan schematic of a sheet of roofing material from which is cut two separate tabbed anterior layers of a prior art two-layer roofing shingle.

Figure 13:
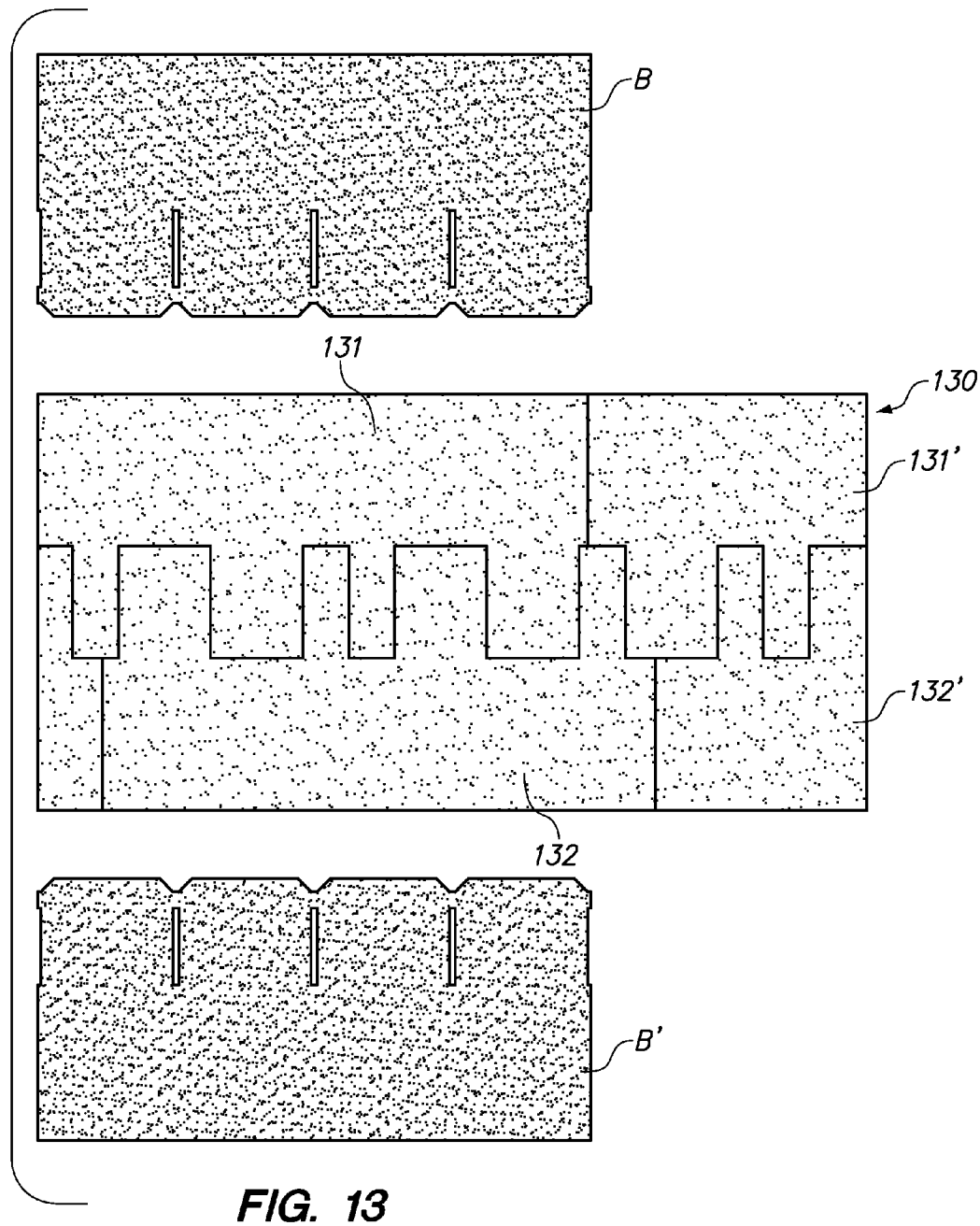
Figure 14:
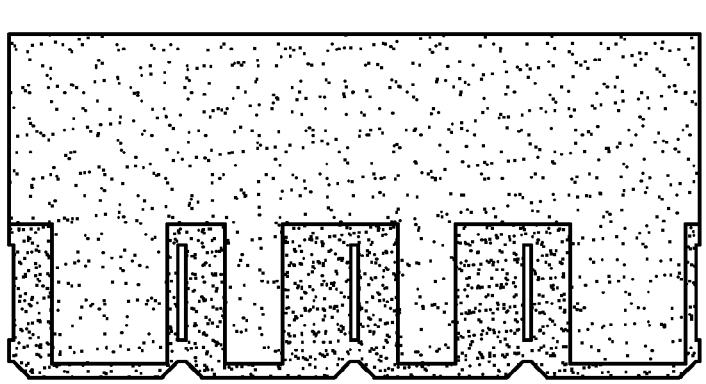
Figure 15:
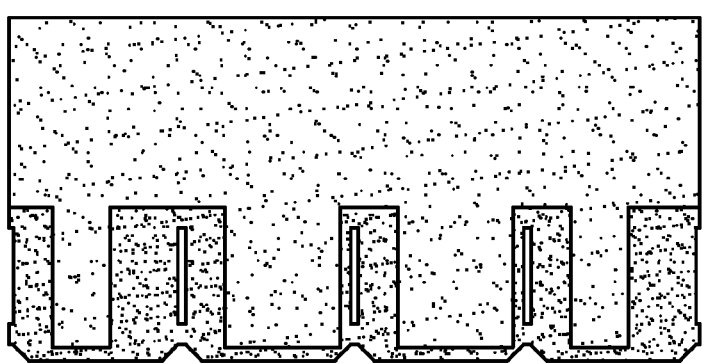
Figure 16:
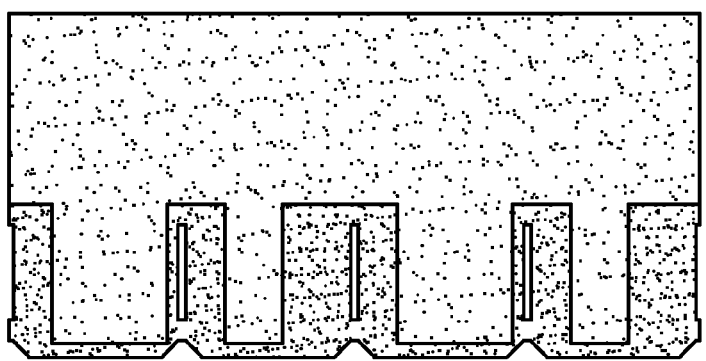
Figure 17:
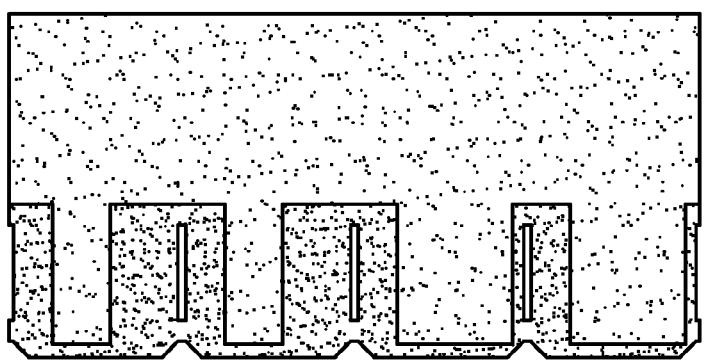
Figure 18:
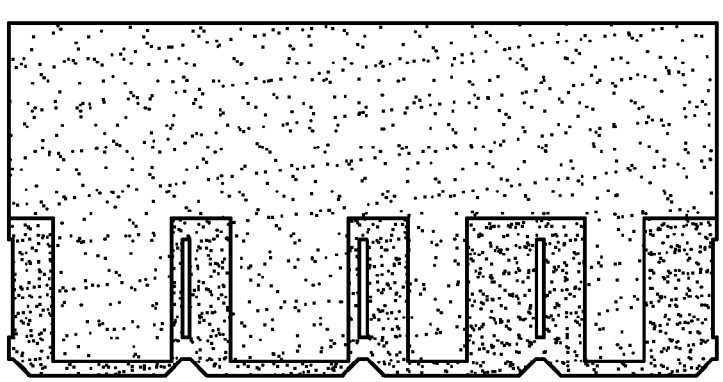
Figure 19:
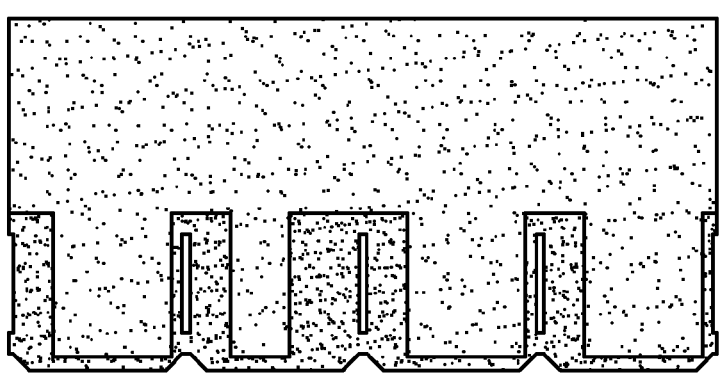
Figure 20:
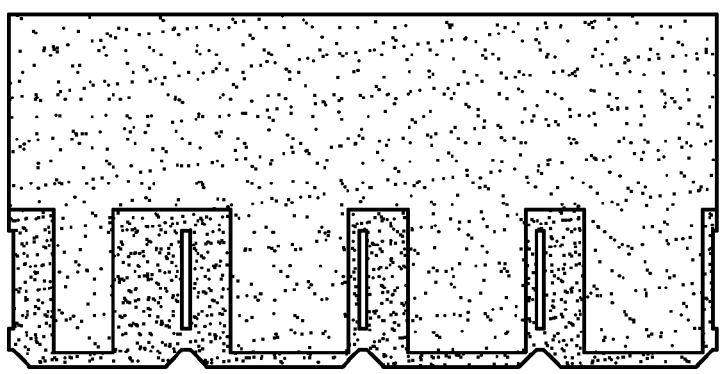
Figure 21:
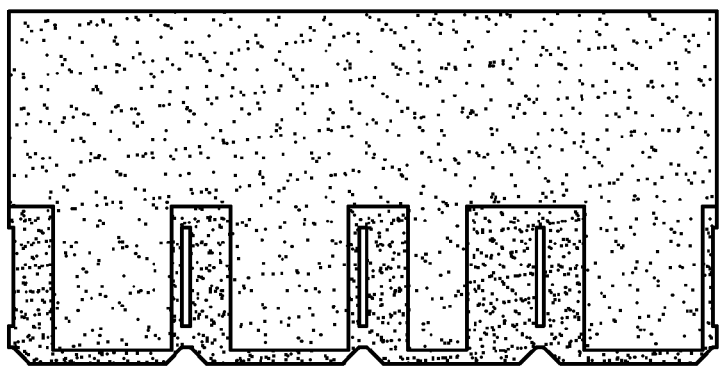
Figure 22:
Figure 23:
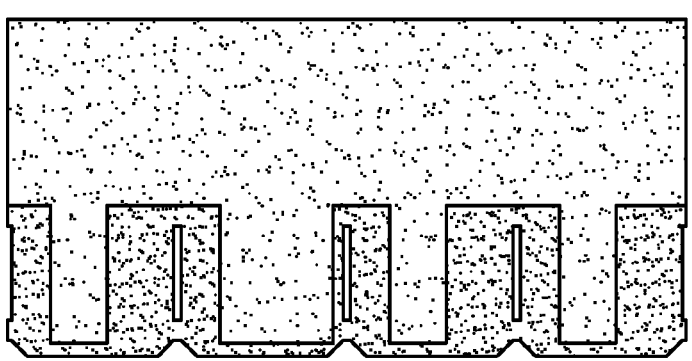
Figure 24:
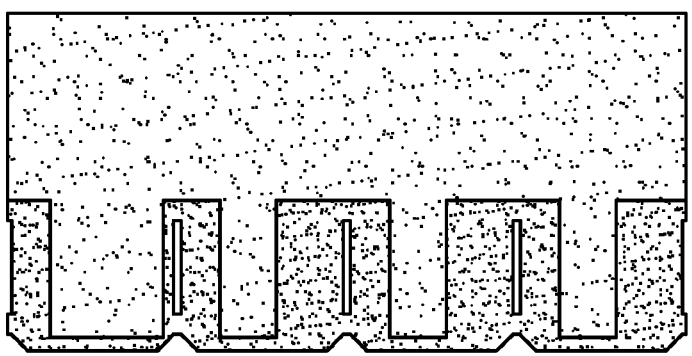
Figure 25:
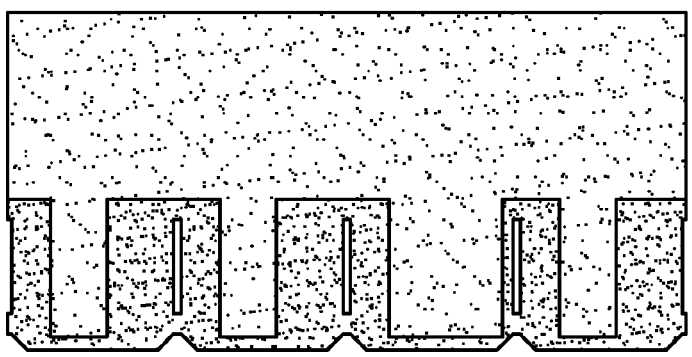
Figure 26:
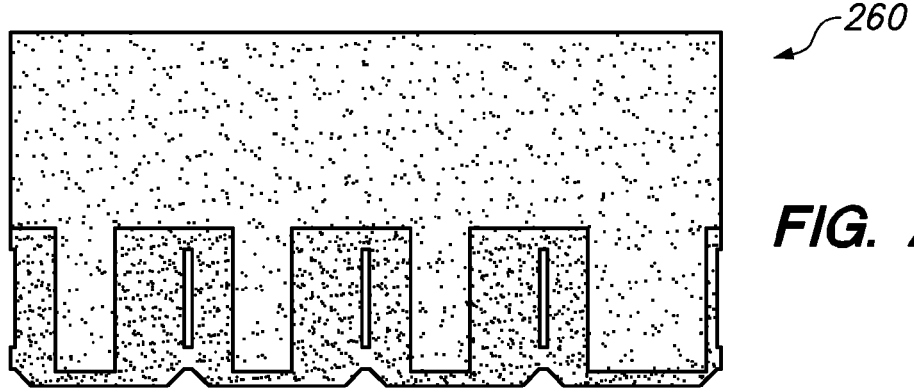

FIG. 13 shows a top plan schematic of a sheet of roofing material from which is cut two separate tabbed anterior layers corresponding to the anterior layers of the shingles of FIG. 1. Also accompanying the sheet of roofing material are two pre-cut posterior layers corresponding to the posterior layers of the shingles of FIG. 1.

FIGS. 14-18 show top plan views of additional exemplary embodiments of the roofing shingle of the present invention, wherein two anterior tabs have a first breadth and two anterior tabs have a second breadth.

FIGS. 19-22 show top plan views of additional exemplary embodiments of the roofing shingle of the present invention, wherein one anterior tab has a first breadth and three anterior tabs have a second breadth.

FIGS. 23-26 show top plan views of additional exemplary embodiments of the roofing shingle of the present invention, wherein three anterior tabs has a first breadth and one anterior tab has a second breadth.

DETAILED DESCRIPTION

The preferred embodiments of the present invention and its advantages are best understood by referring to FIGS. 1 through 26, like numerals being used for like and corresponding parts of the various drawings. The different shadings of the individual layers in the drawings are not intended to signify a particular color value or intensity but only to indicate color contrasts between the layers, and each individual layer may be lighter or darker than the shadings indicate; however a color contrast between the layers is optionally employed.

The first embodiment of the present invention, which relates to two-layer composite roofing shingles having the appearance of variable thickness, will now be described in greater detail by referring to the drawings that accompany the present application.

A shingle 10 incorporating one embodiment of the present invention is shown in FIGS. 1-4, 5 and 7. FIG. 1 illustrates a top plan view of shingle 10. Shingle 10 has a width (w) and a length (l). Shingle 10 comprises an anterior layer A and posterior layer B. Shingle 10 further comprises a composite headlap 101 and a composite buttlap 102, wherein when installed on a roof deck, as illustrated in FIG. 7, at least a portion of the composite headlap 101 of a previously installed shingle 10 is covered by the composite buttlap 102 of a subsequently installed shingle 10.

FIGS. 1A and 1B separately illustrate a top plan view of anterior layer A and posterior layer B, respectively. Referring to FIG. 1A, anterior layer A has a width ($w_A$) and a length ($l_A$). Anterior layer A comprises a headlap portion 1 and a buttlap portion 2. The buttlap portion 2 comprises a plurality of anterior tabs 3 separated by anterior openings 4. Each anterior tab 3 has a breadth selected from at least two breadths 31, 32 and has a height ($h_A$). Preferably, at least one anterior tab 3 has a first anterior tab breadth 31 and at least another anterior tab 3 has a second anterior tab breadth 32. Preferably, the first anterior tab breadth 31 may be between 1 and 5 inches, and more preferably, between 1 and 3 inches. Preferably, the second anterior tab breadth 32 may be between 5 and 10 inches, and more preferably, between 8 and 10 inches. Preferably, the anterior tab height ($h_A$) may be between 4 and 8 inches, and more preferably, between 6 and 8 inches. Preferably, each anterior tab height ($h_A$) is the same for each anterior tab 3. Although FIG. 1A depicts anterior tabs 3 with the same anterior tab height ($h_A$), it is contemplated that one or more anterior tabs 3 may have a different anterior tab height ($h_A$).

The anterior openings have breadths 41, 42. Preferably, at least one anterior opening 4 has a first anterior opening breadth 41 and at least another anterior opening 4 has a second anterior opening breadth 42. Preferably, the first anterior opening breadth 41 may be between 5 and 10 inches, and more preferably, between 8 and 10 inches. Preferably, the second anterior opening breadth 42 may be between 1 and 5 inches, and more preferably, between 1 and 3 inches. In a particularly preferred embodiment, the first anterior tab breadth 31 is equal to the second anterior opening breadth 42 and the second anterior tab breadth 32 is equal to the first anterior opening breadth 41.

Preferably, anterior buttlap portion 2 comprises four anterior tabs 3.

In one particularly preferred embodiment, the first anterior tab breadth 31 is about 2.88 inches and the second anterior tab breadth 32 is about 5.75 inches. The anterior tab height ($h_A$) is about 7.00 inches. The first anterior opening breadth 41 is about 5.75 inches and the second anterior opening breadth 42 is about 2.88 inches.

The anterior tabs 3 may be surfaced with mineral granules, which may be colored mineral granules. The anterior headlap portion 1 may also be surfaced with mineral granules, which may be colored mineral granules. The colored mineral granules of the anterior headlap portion 1 may be the same shade as the anterior tabs 3 or may be different, i.e., the anterior tabs 3 may have a first shade and the anterior headlap portion 1 may have a second shade.

Referring to FIG. 1B, posterior layer B has a width ($w_B$) and a length ($l_B$). Posterior layer B comprises a headlap portion 11 and a buttlap portion 12. The buttlap portion 12 comprises a plurality of posterior simulated tabs 13 separated by posterior partial slots 271, and each of the posterior simulated tabs 13 is connected to at least one adjacent posterior simulated tab 13 by a connecting segment 273. The posterior simulated tabs 13 have a breadth 131 and a height ($h_B$). Preferably, the posterior simulated tab breadth 131 is the same for each posterior simulated tab 13 and may be between 4 and 10 inches, and more preferably, between 7 and 9 inches. The posterior partial slots 271 have a breadth 141, which is preferably the same for each posterior partial slot 271 and may be between ⅛ and ¾ inches, and more preferably, between ⅜ and ½ inches. The posterior partial slots 271 have a height ($h_{271}$), which preferably may be between 50% and 90% of the height ($h_B$) of the posterior simulated tabs 13, and more preferably about 75% of the height ($h_B$) of the posterior simulated tabs 13.

Connecting segments 273 have a height ($h_{273}$), which preferably may be between ¼ and 1¾ inches, and more preferably about 1 inch. The breadth 141 of a connecting segment 273 is commensurate with the breadth 141 of the partial slot 271 above the connecting segment 273.

Preferably, the number of posterior simulated tabs 13 is equal to the number of anterior tabs 3. In a particularly preferable embodiment, anterior layer A comprises four anterior tabs 3 and posterior layer B comprises four posterior simulated tabs 13. However, embodiments with fewer than four anterior tabs 3 and four posterior simulated tabs 13 are contemplated, as well as embodiments with more than four anterior tabs 3 and four posterior simulated tabs 13.

In a particularly preferred embodiment, the posterior simulated tab breadth 131 is about 8.25 inches and the posterior simulated tab height ($h_B$) is about 7.5 inches. The posterior partial slot breadth 141 is about 0.38 inches.

Preferably, the first anterior tab breadth 31 is less than 50% the posterior simulated tab breadth 131 and the second anterior tab breadth 32 is 50% or more, but less than 100%, the posterior simulated tab breadth 131. In a particularly preferred embodiment, the first anterior tab breadth 31 is about 50% the second anterior tab breadth 32.

The posterior simulated tabs 13 are preferably surfaced with mineral granules, which may be colored mineral granules. Preferably, the colored mineral granules of the posterior simulated tabs 13 are a shade having a distinguishable hue or color from the first shade of the anterior tabs 3, and may also be different from the second shade of the anterior headlap portion 1. The contrast in shade between the posterior simulated tabs 13 and the anterior tabs 3 can be accentuated by varying the consistency of the weather resistant top coating, e.g., the density and/or size of granule deposition on either of these members. It will be appreciated that a contrast in shade between any portions or regions of the inventive shingle can similarly be achieved by the methods described herein. It should be noted that the shading of the colored mineral granules is not a necessary element of the present invention and therefore any shading scheme is appropriate.

Referring to FIGS. 1, 1A, and 1B, the exposed top outer surface or weather surface, i.e., the composite buttlap 102 of shingle 10 of the invention may be coated with various types of mineral granules to protect the asphalt coating, to add color to shingle 10 of the invention, and to provide fire resistance. A wide range of mineral colors from white and black to various shades of red, green, brown and any combination thereof may be used on shingle 10 of the invention to provide a roof having the desired color. In some embodiments, the entire top outer surface of shingle 10 of the invention may be coated with any of the aforementioned coatings. In further embodiments, the entire top surface of anterior layer A may be coated with coatings that contrast with coatings applied to the entire top surface of posterior layer B. In another embodiment, the top surface of anterior headlap 1 of shingle 10 of the invention may be coated with coatings that contrast with coatings applied to the top surface of anterior tabs 3 and posterior layer B. In another embodiment, the top surface of anterior headlap 1 may be coated with coatings that contrast with coatings applied to the top surface of anterior tabs 3 and also contrast with coatings applied to the entire top surface of posterior layer B. In another embodiment, the top surface of anterior headlap 1 may be coated with coating that contrast with coatings applied to the posterior simulated tabs 13 and a portion of the posterior headlap 11 that may be exposed. The underside of shingle 10 of the invention may be coated with various inert minerals with sufficient consistency to seal the asphalt coating. These modifications may be applied to any contemplated embodiment of the invention in any combination.

FIGS. 1 and 5 depict shingle 10 with the anterior layer A positioned on the posterior layer B in a manner such that each anterior tab 3 is positioned over a corresponding posterior simulated tab 13, wherein the anterior tabs 3 are positioned off-center of the posterior simulated tabs 13.

Figure 2:
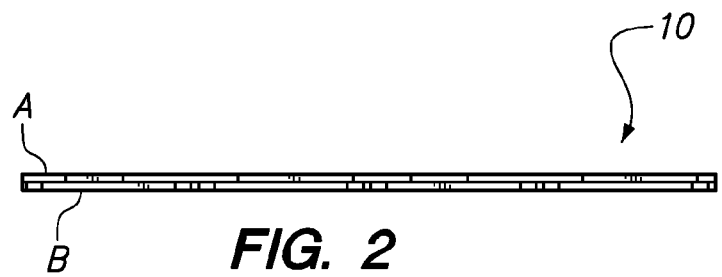
FIG. 2 shows a front elevation view of the exemplary embodiment of the roofing shingle of the present invention depicted in FIG. 1.
Figure 3:
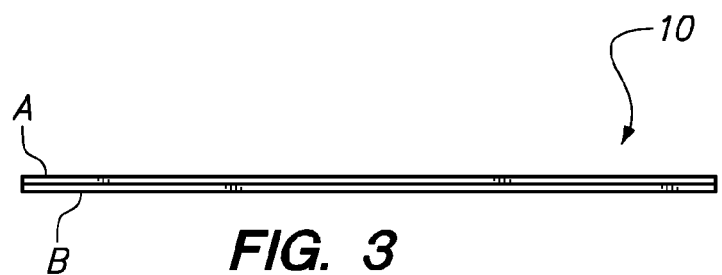
FIG. 3 shows a rear elevation view of an exemplary embodiment of the roofing shingle of the present invention.

FIGS. 2 and 3 illustrate front elevation and rear elevation views of shingle 10, respectively, with the anterior layer A positioned on the posterior layer B in a manner such that the left and right side edges of both layers are flush, respectively.

Figure 4:
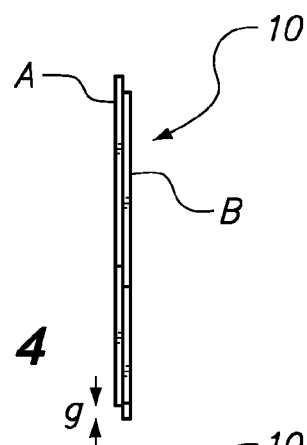
Figure 4A:
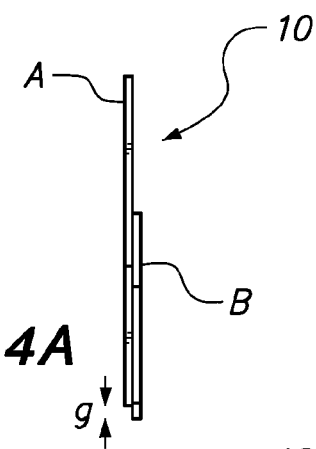
Figure 4B:
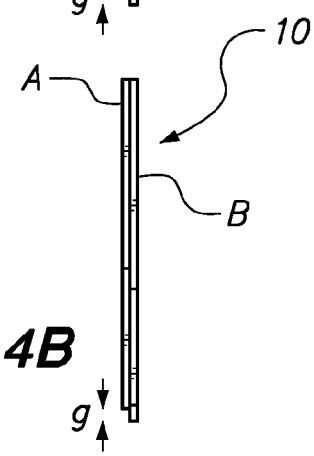
Figure 4C:
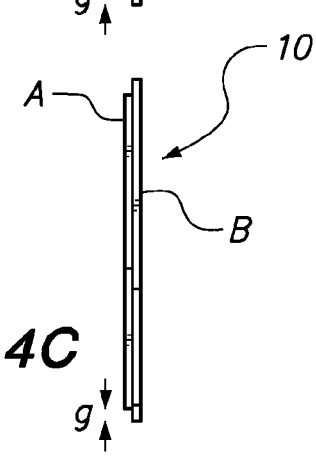

FIG. 4 illustrates a right side view of shingle 10 with anterior layer A positioned on the posterior layer B in a manner such that the front and rear edges of both layers are offset, respectively. Referring back to FIG. 1, this offset positioning results in a gap (g), or an exposed top portion of each posterior simulated tab 13, between the front edge of the posterior simulated tab 13 and the front edge of the corresponding anterior tab 3. Preferably, gap (g) is between 0 and 1 inches, and more preferably, between ⅜ and ¾ inches. Referring to FIGS. 1A and 1B, in a preferred embodiment, width of the anterior layer A ($w_A$) is about equal to the width of the posterior layer B ($w_B$). In a particularly preferred embodiment, width of the anterior layer A ($w_A$) is greater than the width of the posterior layer B ($w_B$). See FIG. 4A. It is further contemplated that the width of the anterior layer A ($w_A$) may be less than the width of the posterior layer B ($w_B$). See FIGS. 4B and 4C.

Referring to FIGS. 1, 1A, and 1B, it will be appreciated that when the width of the anterior layer A ($w_A$) is about equal the width of the posterior layer B ($w_B$) and the anterior tab height ($h_A$) is about equal to the posterior simulated tab height ($h_B$) any offset resulting in a gap (g) will also result in a portion of the posterior headlap 11 being exposed to the elements as part of the composite buttlap 102. In other words, in such an embodiment, a portion of the posterior headlap 11, along with the posterior buttlap 12 and anterior buttlap 2 will operate as the exposed composite buttlap 102 of shingle 10.

Exemplary shingle 10 further comprises anterior layer A, wherein each anterior tab 3 has right angle corners and each anterior opening 4 has right angle corners. Alternatively, in another embodiment, shingle 60, depicted in FIG. 6, the anterior tabs 63 have crimped corners (i.e., cut at approximately 45 degree angles) and the anterior openings have crimped corners (i.e., cut at approximately 45 degree angles). It is contemplated that the crimped corners may be cut at any suitable angle for a desired appearance. It should be noted that similar modifications can be done independently to the posterior simulated tabs 13 and remain within the scope of the invention. In other words, it is contemplated that the posterior simulated tabs 13 may have right angle corners. See shingles 90 and 100 depicted in FIGS. 9 and 10, respectively.

Exemplary shingle 10 further comprises anterior tabs 3 and anterior openings 4 having straight edges. It is contemplated, however, that the edges of the anterior tabs 3 and anterior openings 4 may have non-straight, irregular edges. See shingle 110 depicted in FIG. 11. Referring to FIG. 8, it is also contemplated that the edges of the anterior tabs 83 of shingle 80 may have "stair-stepped" edges. It is further contemplated that the edges of the anterior tabs 3 may be trapezoidal (i.e., wider at the top or bottom of the tab), angular (i.e., the bottom of the tab may be cut at a slant rather than perpendicularly straight across), curved, or jagged. It should be noted that these modifications to the anterior tabs 3 may also be done to the posterior simulated tabs 13 in any contemplated combination and remain within the scope of the invention.

FIGS. 14-26 illustrate top plan views of additional exemplary embodiments of the two-layer shingle of the invention, wherein each embodiment has at least one anterior tab with a first breadth and at least another anterior tab with a second breadth.

FIG. 7 depicts a particularly preferred roofing system embodiment of the present invention, wherein shingles 10, 140, 150 of the invention are installed as they would be applied to a roof deck, such that a part of the headlap portion 101 of a previously installed course of shingles lies beneath a part of the buttlap portion 102 of a subsequently installed course of shingles. As depicted in FIG. 7, five separate courses of shingles 10, 140, 150 are installed as they would be in an offset manner. In a particularly preferred embodiment, anterior tabs 3 create a pattern (i.e., a "tab pattern") that spans a course of three adjacent shingles 10, 140, 150, wherein an anterior tab pair 5 (having the second anterior tab breadth 32) is adjacent to another anterior tab pair 6 having the first anterior tab breadth 31, but the first and second subsequent adjacent anterior tabs 7 have different tab breadths from each other. This tab pattern repeats itself across the span of the course, which creates a pleasing aesthetic appearance that resembles more expensive roofing material, such as tile, slate, or wood shakes. The pattern of the anterior tabs provides a seemingly random appearance that provides the illusion of texture and variation inherent in individual pieces of more expensive roofing materials. The visual appearance of the shingles may be further enhanced by methods well-known in the art, e.g., employing shadow tips or shadow bands. In a further preferred embodiment, the shingles have an anterior tab pattern with at least two tabs of different breadth and at least two openings of different breadth and the shingles have a posterior layer with simulated tabs having a uniform breadth, i.e., each posterior simulated tab has the same breadth.

In other preferred embodiments, the shingles of the invention may further be deployed in a roofing system, wherein first, second, and third adjacent shingles differ from each other based on the arrangement of the anterior tabs with different breadths (see, e.g., FIG. 7 and shingles 10, 140, 150), and wherein the first adjacent shingle and the fourth adjacent shingle in a course are identical based on the arrangement of the anterior tabs with different breadths (see, e.g., FIG. 7), so that when installed, a pattern of varying anterior tabs is created based on the location of the anterior tabs with different breadths.

The shingles of the invention may further be deployed in a roofing system, wherein first, second, third, fourth, and fifth adjacent shingles differ from each other based on the arrangement of the anterior tabs with different breadths, and wherein the first adjacent shingle and the sixth adjacent shingle in a course are identical based on the arrangement of the anterior tabs with different breadths, so that when installed, a pattern of varying anterior tabs is created based on the location of the anterior tabs with different breadths.

The shingles of the invention may further be deployed in a roofing system, wherein first, second, third, fourth, fifth, and sixth adjacent shingles differ from each other based on the arrangement of the anterior tabs with different breadths, and wherein the first adjacent shingle and the seventh adjacent shingle in a course are identical based on the arrangement of the anterior tabs with different breadths, so that when installed, a pattern of varying anterior tabs is created based on the location of the anterior tabs with different breadths.

The shingles of the invention may further be deployed in a roofing system, wherein first, second, third, fourth, fifth, sixth, and seventh adjacent shingles differ from each other based on the arrangement of the anterior tabs with different breadths, and wherein the first adjacent shingle and the eighth adjacent shingle in a course are identical based on the arrangement of the anterior tabs with different breadths, so that when installed, a pattern of varying anterior tabs is created based on the location of the anterior tabs with different breadths.

It is further contemplated that odd numbered adjacent shingles, i.e., first, third, fifth, etc., adjacent shingles are identical to each other based on the arrangement of the anterior tabs with different breadths and differ from even numbered adjacent shingles, i.e., second, fourth, sixth, etc., adjacent shingles, based on the arrangement of the anterior tabs with different breadths, and wherein the even numbered adjacent shingles are identical to each other based on the arrangement of the anterior tabs with different breadths.

Not being limited to any particular theory, the aesthetically pleasing and seemingly random appearance of a particularly preferred embodiment of the installed shingles of the invention may result from the arrangement of anterior tabs and anterior openings having the same breadth, wherein said anterior openings appear to be voids where said anterior tabs should be situated. See FIG. 7, feature 8. The void of said anterior tabs may create a visual illusion of missing anterior tabs, which may resemble prior art shingles that have utilized the absence of anterior tabs to create the appearance of bulk and randomness of more expensive roofing materials. See, e.g., U.S. Pat. No. 7,805,905. It should be noted, however, that unlike the prior art shingles, each of the posterior simulated tabs of the shingles of the invention is at least partially covered by an anterior tab. Also, the visual appearance of the anterior tab pattern may further be enhanced by the uniform posterior simulated tab pattern, wherein the partial slots between the simulated tabs provide the visual appearance of increased thickness to the buttlap portion of the shingle.

An exemplary non-limiting method of manufacturing the inventive shingle embodiments is described with reference to the two-layer composite shingle.

Manufacturing the two-layer composite shingle includes applying granules to asphalt coated sheeting, where the granules can be blended to produce the desired shading and then applied to the surface of the asphalt sheet. The granule laden asphalt sheet is then pressed in a press roll unit, such that the granules embed in the asphalt coating. The asphalt sheet is then cut to the desired shape. The cutting process first measures out one shingle length of material and then feeds the measured amount into the cutting module. The cutting module preferably includes a rotary cutting cylinder with hardened steel tooling. The tab pattern of anterior layer A is cut using a fractional cutting cylinder, where the fractional cutting cylinder produces a pattern that is a fraction of the shingle length. This provides a substantially repeating pattern.

The shingles of the invention may be cut using a cutting cylinder having a diameter which is a portion of the shingle length (e.g. a cutting cylinder diameter 1.5 times the length of the shingle). The cutting cylinder may be designed such that the pattern of posterior simulated tabs 13 may or may not be cut at a greater frequency than the pattern of anterior tabs 3.

For example, a fractional cutting cylinder with a pattern and a circumference that is 1.5 times the length of a single shingle may produce three distinct shingles every two rotations. Such a pattern will repeat itself every fourth shingle. In a preferred embodiment the pattern extends across the entire cutting cylinder. By utilizing a fractional cutting cylinder circumference, the maximum amount of patterns for the minimum amount of diameter can be produced. The preferred cylinder circumference is between about 1.25 and about 1.75 greater than the length of a single shingle. A cutting cylinder that is 1.25 times the shingle length may produce five distinct shingles per four rotations, while a cutting cylinder with a circumference that is 1.75 times the shingle length may produce seven distinct shingles per four rotations. In a most preferred embodiment, a cutting cylinder having a pattern and a circumference that is 1.5 times the length of shingle 10 is used to cut each anterior layer A for each shingle 10. The posterior layer B is preferably cut using a non-fractional cylinder pattern.

Referring back to FIG. 7, the exemplary shingles 10, 140, 150 were formed with a cutting cylinder having a circumference that is 1.5 times the length of shingle 10, 140, 150, which creates three distinct anterior layers. The pattern of the cutting cylinder can be seen across the anterior layer of shingle 10 and half of the anterior layer of shingle 140. The pattern repeats and continues across the other half of the anterior layer of shingle 140 and the anterior later of shingle 150. The sequence of anterior tabs repeats after the third shingle. Such a pattern and sequence of anterior tabs of this particularly preferred embodiment helps convey a random appearance.

Following cutting, the posterior layer B and anterior layer A are joined. In broad terms, preferably, an adhesive is applied to the posterior layer B and/or anterior layer A, wherein following the application of the adhesive the posterior layer B and anterior layer A are pressed together. The pressed posterior layer B and anterior layer A are then cut to a predetermined shingle length.

Preferably, the present invention also allows for a reduction in material waste during manufacturing compared to the manufacturing of prior art shingles. Prior art tabbed two-layer shingles have created the appearance of randomness and thickness of more expensive roofing material by providing at least one tab that is only one layer thick or single-layer tabs (i.e., the posterior tabs that are not covered by an anterior tab). Such prior art shingles utilize an anterior layer with tabs, wherein each anterior tab has the same breadth and the anterior tabs are positioned substantially over the center of the posterior tabs, which have a wider breadth than the anterior tabs. See U.S. Pat. No. 7,805,905. Despite cutting complementary anterior layers from a single layer of roofing material, the process creates scraps between the anterior tabs. The present invention minimizes scrap material by utilizing the entire (or nearly the entire) amount of single layer of roofing material apportioned for the formation of the anterior layers.

As depicted in FIG. 12, complementary prior art anterior layers 121 and 122 are cut from a shingle sheet of roofing material 120. For the prior art embodiment illustrated, each anterior layer has two anterior tabs 123. When the anterior layers 121 and 122 are positioned over a four-tabbed posterior layer (not shown) according to U.S. Pat. No. 7,805,905, each anterior layer will have two anterior tabs missing resulting in two posterior tabs that are uncovered by an anterior tab (not shown). The formation of anterior layers 121 and 122 from the single sheet of roofing material 120 results in the cutting of scraps 124. Due to the shape and configuration of the prior art anterior tabs 123, waste roofing material is created. Elements 121' and 122' represent partial views of additional material portions to be cut from roofing material 120 that will form additional anterior layer pieces.

Contrary to prior art methods, the anterior tabs of the present invention have differing breadths, which allows for the use of the entire sheet (or nearly the entire sheet, e.g., if anterior tabs have crimped corners) of roofing material to form two complementary anterior layers A, as illustrated in FIG. 13. FIG. 13 is a schematic depicting how two complementary anterior layers A (represented by material portions 131 and 132, respectively) are cut from a single layer of roofing material 130 and aligned with posterior layers B and B' to form two exemplary shingles 10. It will be appreciated that anterior layers A (represented by material portions 131 and 132, respectively) have anterior tabs with differing breadths that are present in complementary patterns that utilize the entire length of roofing material 130. Thus, when anterior layers A are formed from a sheet of roofing material according to the invention few or no scraps are generated. It will be further appreciated that the posterior layer B' intended to form a second shingle 10 has been shifted to the right in order to conceptualize the proper alignment of posterior layer B' with respect to anterior layer A (represented by material portions 132) to form a second shingle 10. Elements 131' and 132' represent partial views of additional material portions to be cut from roofing material 130 that will form additional anterior layer pieces.

For one embodiment of the present invention, the shingle 10 may be formed from a fiberglass mat (not shown) with an asphalt coating on both sides of the mat. If desired, the present invention may also be used with shingles formed from organic felt or other types of base material, including but not limited to synthetic mats or synthetic glass/hybrid mats having an appropriate coating. Nonlimiting embodiments of coatings include asphalt and modified bituminous coatings based on atactic polypropylene (APP), styrene-butadiane-styrene (SBS), styrene-ethylene-butadiene-styrene (SEBS), amorphous polyalpha olefin (APAO), thermoplastic polyolefin (TPO), synthetic rubber or other asphaltic modifiers.

Additional embodiments include laminated tabbed shingles with three or more layers (not shown) as long as at least one simulated tab is partially one layer thick or a partially covered single-layer simulated tab, and no simulated tabs are entirely one layer thick.

An important feature of the present invention includes providing roofing shingles having posterior simulated tabs that are each partially covered by an anterior tab. Prior art two-layer, or bilaminated, shingles with posterior tabs that are not at least partially covered by an anterior tab are susceptible to wind failure. In particular, the prior art single-layered tabs (i.e., posterior tabs without at least partial cover from anterior tabs) are susceptible to wind failure upon installation (prior to sealing) and even after the shingles have been sealed. Applicants have surprisingly found that two-layer shingle tabs have improved wind failure resistance over single-layer shingle tabs before the shingles have been sealed and even after the shingles have been sealed.

Test 1: Applicants prepared prior art shingles having single-layer tabs and prior art shingles having double-layer tabs. Test samples were conditioned at 73° F. (meaning bundles of shingles were placed in a climate controlled environment to allow the temperature to reach a steady state of 73° F.) and then applied to a test deck, wherein the test samples were not allowed to fully seal to the test deck or to adjacent shingles (meaning testing began shortly after the shingles were installed on the test deck before a proper bond could be achieved between the shingles and the test deck or adjacent shingles). Wind resistance testing was performed on the test samples, wherein a wind generator was directed at the installed test samples and the wind speed was incrementally increased until shingle tabs lifted from the test deck. Results are provided in Table 1 below.

TABLE 1

| Wind Speed (MPH) | Single-layer Tabs Lifted | Double-layer Tabs Lifted | Comments |
|---|---|---|---|
| 40 | X | | Multiple single layer teeth lifted immediately at the start of the test. |
| 50 | | | |
| 60 | | | |
| 70 | | X | Multiple double layer teeth started to lift at 19 minutes. |

Test 2: Applicants prepared prior art shingles as in Test 1 (i.e., conditioned at conditioned at 73° F.). The shingles were then installed on a test deck (i.e., a substrate surface) at an ambient temperature of 73° F. The test deck was then conditioned at 140° F. for 16 hours to allow the sealant to bond (i.e., the sealant between the shingle and substrate surface was allowed to form a proper bond), then the test deck was conditioned back to an ambient temperature of 73° F. prior to testing. Mechanical uplift resistance testing was performed on the test samples, wherein the substrate surface was held down while the test apparatus measured the resistance (in lbs) necessary to peel away a shingle tab from the substrate surface. Results are provided in Table 2 below.

TABLE 2

| | Mechanical Uplift Resistance (lbs) Thickness | |
|---|---|---|
| Sample | Single | Double |
| 1 | 28.32 | 30.87 |
| 2 | 22.91 | 42.45 |
| 3 | 22.87 | 23.07 |
| 4 | 22.89 | 27.32 |
| Average | 24.25 | 30.93 |

It was believed that fully sealed test shingle tabs, whether single-layer or double-layer, would exhibit similar wind failure resistance because the bond strength of the sealant would dictate performance. However, in Test 2, Applicants have surprisingly found that the two-layered tabs had improved wind failure resistance (measured as mechanical uplift resistance) compared to the single-layer tabs even though both sets of tabs were fully sealed to the substrate surface. The uplift resistance of the sealed double-layer tab was 28% greater than the sealed single-layer tab.

Another important feature of the present invention includes providing a connecting segment 273. In addition to the weather performance imparted by the above-tested features (e.g., partially covered tabs), it is believed that connecting segment 273 will provide increased rigidity to single-thickness posterior simulated tabs (which resemble traditional, discrete tabs) thereby further improving the shingle's wind failure resistance compared to the prior art.

Although the present invention and its advantages have been described in detail, it should be understood that various changes, substitutions and alterations can be made therein without departing from the spirit and scope of the invention as defined by the appended claims.

What is claimed is:

1. A laminated roofing shingle comprising:
   (a) a posterior layer having a posterior headlap portion and a posterior buttlap portion including a plurality of posterior simulated tabs extending from said posterior headlap portion, said posterior simulated tabs spaced apart by a plurality of posterior partial slots, and each of said posterior simulated tabs is connected to at least one adjacent posterior simulated tab by a connecting segment;
   (b) an anterior layer having an anterior headlap portion and an anterior buttlap portion including a plurality of anterior tabs extending from said anterior headlap portion, said anterior tabs spaced apart to define a plurality of anterior openings between said anterior tabs; and
   wherein the anterior layer is positioned on the posterior layer in a manner such that each anterior tab is positioned over a corresponding posterior simulated tab such that each of the posterior simulated tabs is at least partially covered by one of the anterior tabs;
   wherein the number of posterior simulated tabs is equal to the number of anterior tabs;
   wherein the posterior simulated tabs have a given breadth that is about equal for each posterior simulated tab;
   wherein at least one anterior tab has a first anterior tab breadth and at least another anterior tab has a second anterior tab breadth that differs from the first anterior tab breadth;
   wherein at least one anterior opening has a first anterior opening breadth that is about equal to the second anterior tab breadth;
   and wherein at least another anterior opening has a second anterior opening breadth that is about equal to the first anterior tab breadth.

2. The roofing shingle according to claim 1,
   wherein at least one anterior tab has a first anterior tab breadth that is less than 50% the breadth of each posterior simulated tab;
   wherein at least another anterior tab has a second anterior tab breadth that is 50% or more, but less than 100%, the breadth of each posterior simulated tab;
   and wherein each anterior tab does not extend over any said posterior partial slot.

3. The roofing shingle according to claim 1, wherein the shingle has no alignment notch in the anterior headlap.

4. The roofing shingle according to claim 1, comprising four posterior simulated tabs and four anterior tabs.

5. The roofing shingle according to claim 1, wherein the first anterior tab breadth is about 50% the breadth of the second anterior tab breadth.

6. The roofing shingle according to claim 1, wherein each anterior tab has right angle corners and each anterior opening has right angle corners.

7. The roofing shingle according to claim 1, wherein each anterior tab has crimped corners and each anterior opening has crimped corners.

8. The roofing shingle according to claim 1, wherein each anterior tab has non-straight irregular edge contours.

9. The roofing shingle according to claim 1, wherein each posterior simulated tab has right angle corners and each posterior partial slot has right angle corners.

10. The roofing shingle according to claim 1, wherein each posterior simulated tab has crimped corners.

11. The roofing shingle according to claim 1, wherein each anterior tab has an edge contour selected from the group consisting of stair-stepped, trapezoidal, angular, curved or jagged edge contours.

12. The roofing shingle according to claim 1, wherein the first anterior tab breadth is about 2.88 inches and the second anterior tab breadth is about 5.75 inches, and the breadth of the posterior simulated tabs is about 8.25 inches.

13. The roofing shingle according to claim 1, wherein the shingle is a two-layer laminated roofing shingle.

14. A roofing system comprising at least four adjacent shingles, each of first, second, third, and fourth adjacent shingles comprising:
(a) a posterior layer having a posterior headlap portion and a posterior buttlap portion including four posterior simulated tabs extending from said posterior headlap portion, said posterior simulated tabs spaced apart by a plurality of posterior partial slots, and each of said posterior simulated tabs is connected to at least one adjacent posterior simulated tab by a connecting segment;
(b) an anterior layer having an anterior headlap potion and an anterior buttlap portion including four anterior tabs extending from said anterior headlap portion, said anterior tabs spaced apart to define a plurality of anterior openings between said anterior tabs;
wherein the anterior layer is positioned on the posterior layer in a manner such that each anterior tab is positioned over a corresponding posterior simulated tab such that each of the posterior simulated tabs is at least partially covered by one of the anterior tabs;
wherein the posterior simulated tabs have a given breadth that is about equal for each posterior simulated tab;
wherein at least one anterior tab has a first anterior tab breadth that is less than 50% the breadth of each posterior simulated tab;
wherein at least another anterior tab has a second anterior tab breadth that is 50% or more, but less than 100% the breadth of each posterior simulated tab;
wherein each of the first, second, and third adjacent shingles differ from each other based on the positions of the at least one anterior tab having the first anterior tab breadth and the at least another anterior tab having the second anterior tab breadth;
and wherein the first adjacent shingle and the fourth adjacent shingle are identical based on the positions of the at least one anterior tab having the first anterior tab breadth and the at least another anterior tab having the second anterior tab breadth, so that when installed, a pattern of varying anterior tab breadths is created based on the respective positions of the anterior tabs having the first anterior tab breadth and the anterior tabs having the second anterior tab breadth.

15. The roofing system of claim 14, wherein at least one of the at least four adjacent shingles has two anterior tabs having said first anterior tab breadth and two anterior tabs having said second anterior tab breadth.

16. The roofing system of claim 14, wherein at least one of the at least four adjacent shingles has one anterior tab having said first anterior tab breadth and three anterior tabs having said second anterior tab breadth.

17. The roofing system of claim 14, wherein at least one of the at least four adjacent shingles has three anterior tabs having said first anterior tab breadth and one anterior tab having said second anterior tab breadth.

18. A roofing system comprising a plurality of courses of shingles according to claim 1, wherein the shingles are installed on a roof deck in overlapping courses.

19. A laminated roofing shingle comprising:
(a) a posterior layer having a posterior headlap portion and a posterior buttlap portion including a plurality of posterior simulated tabs extending from said posterior headlap portion, said posterior simulated tabs spaced apart by a plurality of posterior partial slots, and each of said posterior simulated tabs is connected to at least one adjacent posterior simulated tab by a connecting segment;
(b) an anterior layer having an anterior headlap portion and an anterior buttlap portion including a plurality of anterior tabs extending from said anterior headlap portion, said anterior tabs spaced apart to define a plurality of anterior openings between said anterior tabs; and
wherein the anterior layer is positioned on the posterior layer in a manner such that each anterior tab is positioned over a corresponding posterior simulated tab such that each of the posterior simulated tabs is at least partially covered by one of the anterior tabs;
wherein each anterior tab extends over no posterior partial slot;
wherein the number of posterior simulated tabs is equal to the number of anterior tabs;
wherein said roofing shingle has a length;
wherein the posterior layer is formed from a cutting cylinder having a circumference that is equal to the length of said roofing shingle;
and wherein the anterior layer is formed from a cutting cylinder having a circumference that is a fraction of the length of said roofing shingle.

20. The roofing shingle according to claim 19, wherein the cutting cylinder used to form the anterior layer has a circumference that is a 1.5 times the length of said roofing shingle.

21. The roofing shingle according to claim 19, wherein the shingle is a two-layer laminated roofing shingle.

22. A roofing system comprising a plurality of courses of shingles according to claim 19, wherein the shingles are installed on a roof deck in overlapping courses.

* * * * *

UNITED STATES PATENT AND TRADEMARK OFFICE
CERTIFICATE OF CORRECTION

PATENT NO.        : 9,140,012 B1
APPLICATION NO.   : 14/577029
DATED             : September 22, 2015
INVENTOR(S)       : Leitch et al.

Page 1 of 1

It is certified that error appears in the above-identified patent and that said Letters Patent is hereby corrected as shown below:

IN THE SPECIFICATION

<u>COLUMN 10:</u>

Line 67, "length ($l_3$)." should read --length ($l_B$).--

<u>COLUMN 17:</u>

Line 26, "conditioned at" ($2^{nd}$ occurrence) should be deleted.

Signed and Sealed this
Twenty-second Day of March, 2016

Michelle K. Lee
*Director of the United States Patent and Trademark Office*